US008739832B2

(12) United States Patent
Young et al.

(10) Patent No.: US 8,739,832 B2
(45) Date of Patent: *Jun. 3, 2014

(54) MOTOR ASSEMBLY FOR PNEUMATIC TOOL

(75) Inventors: Randi J. Young, Randolph, NJ (US); Nathanael S. Murphy, Hellertown, PA (US)

(73) Assignee: Ingersoll-Rand Company, Montvale, NJ (US)

( * ) Notice: Subject to any disclaimer, the term of this patent is extended or adjusted under 35 U.S.C. 154(b) by 33 days.

This patent is subject to a terminal disclaimer.

(21) Appl. No.: 13/404,889

(22) Filed: Feb. 24, 2012

(65) Prior Publication Data
US 2012/0152386 A1 Jun. 21, 2012

Related U.S. Application Data

(63) Continuation of application No. 12/115,185, filed on May 5, 2008, now Pat. No. 8,122,907.

(51) Int. Cl.
*F16K 11/074* (2006.01)
(52) U.S. Cl.
USPC ....... 137/625.46; 137/876; 173/169; 173/221
(58) Field of Classification Search
USPC ........ 137/625.11, 625.46, 861, 876; 173/169, 173/218, 221
See application file for complete search history.

(56) References Cited

U.S. PATENT DOCUMENTS 2,827,924 A * 3/1958 Towler et al. ............ 137/625.11
3,223,182 A 12/1965 Mikiya
4,222,443 A 9/1980 Chromy
4,355,564 A 10/1982 Gidlund
4,379,492 A 4/1983 Hiraoka
4,434,858 A 3/1984 Whitehouse
4,476,942 A * 10/1984 Elkin ......................... 173/169
4,488,604 A 12/1984 Whitehouse (Continued)

FOREIGN PATENT DOCUMENTS

CN 1494988 5/2004
CN 2719502 8/2005

OTHER PUBLICATIONS

Office Action from the State Intellectual Property Office of the People's Republic of China for Application No. 200910118442.5 dated Jul. 30, 2012 (English Translation and Original, 9 pages).

(Continued)

*Primary Examiner* — Eric Keasel
*Assistant Examiner* — R. K. Arundale
(74) *Attorney, Agent, or Firm* — Michael Best & Friedrich LLP

(57) ABSTRACT

A valve arrangement includes an inlet conduit defining an inlet passage adapted for communication with a supply of pressurized motive fluid, a first planar surface spaced radially from the inlet conduit, first and second supply passages communicating through the first planar surface, and a rotary valve. The rotary valve includes a second planar surface abutting against the first planar surface and a valve passage communicating through the second planar surface. The rotary valve is rotatable to place the inlet passage in communication with a selected one of the first and second supply passages through the valve passage, and is adapted to conduct the pressurized motive fluid from the inlet passage to the selected one of the first and second supply passages.

19 Claims, 14 Drawing Sheets

(56) References Cited

U.S. PATENT DOCUMENTS

| | | | |
|---|---|---|---|
| 4,625,999 A | 12/1986 | Valentine et al. | |
| 4,708,210 A | 11/1987 | Rahm | |
| 4,740,144 A | 4/1988 | Biek | |
| 4,776,561 A | 10/1988 | Braunlich | |
| 5,022,469 A | 6/1991 | Westerberg | |
| D323,961 S | 2/1992 | Fushiya et al. | |
| D335,808 S | 5/1993 | Bruno et al. | |
| 5,210,918 A | 5/1993 | Wozniak et al. | |
| 5,293,747 A | 3/1994 | Geiger | |
| 5,346,021 A | 9/1994 | Braunlich | |
| 5,346,024 A | 9/1994 | Geiger et al. | |
| D352,645 S | 11/1994 | Ichikawa | |
| 5,377,769 A * | 1/1995 | Hasuo et al. | 173/169 |
| 5,443,196 A | 8/1995 | Burlington | |
| 5,505,676 A | 4/1996 | Bookshar | |
| D372,850 S | 8/1996 | Dubuque et al. | |
| 5,626,198 A | 5/1997 | Peterson | |
| D380,949 S | 7/1997 | Sung | |
| 5,813,477 A | 9/1998 | Clay et al. | |
| D414,093 S | 9/1999 | Zurwelle | |
| 6,039,231 A | 3/2000 | White | |
| 6,047,780 A * | 4/2000 | Lin | 173/168 |
| 6,179,063 B1 | 1/2001 | Borries et al. | |
| 6,250,399 B1 | 6/2001 | Giardino | |
| D444,363 S | 7/2001 | Hayakawa et al. | |
| D447,029 S | 8/2001 | Sun et al. | |
| 6,460,629 B2 | 10/2002 | Bookshar et al. | |
| D476,870 S | 7/2003 | Hayakawa et al. | |
| 6,691,798 B1 | 2/2004 | Lindsay | |
| D497,785 S | 11/2004 | Izumisawa | |
| D502,071 S | 2/2005 | Snider | |
| 6,880,645 B2 | 4/2005 | Izumisawa | |
| 6,902,011 B2 * | 6/2005 | Hall | 173/169 |
| 6,929,074 B1 | 8/2005 | Lai | |
| D510,513 S | 10/2005 | Aglassinger | |
| D511,284 S | 11/2005 | Henssler et al. | |
| 7,040,414 B1 | 5/2006 | Kuo | |
| D525,502 S | 7/2006 | Chen | |
| D529,353 S | 10/2006 | Wong et al. | |
| D530,171 S | 10/2006 | Baker | |
| 7,140,179 B2 | 11/2006 | Bass et al. | |
| 7,325,627 B2 * | 2/2008 | Tanji | 173/169 |
| D569,206 S | 5/2008 | Takahagi et al. | |
| 8,122,907 B2 * | 2/2012 | Young et al. | 137/625.46 |
| 2003/0075348 A1 | 4/2003 | Eardley et al. | |

OTHER PUBLICATIONS

First Office Action from the State Intellectual Property Office of China for Application No. CN200810188483.7 dated Dec. 25, 2012 (10 pages with English translation).

Stanley Air Tools Valve, 3 Pages, Published Prior to May 5, 2008.

* cited by examiner

MOTOR ASSEMBLY FOR PNEUMATIC TOOL

RELATED APPLICATION DATA

This patent application is a continuation of U.S. patent application Ser. No. 12/115,185, filed May 5, 2008, the entire contents of which are incorporated herein by reference.

FIELD OF THE INVENTION

The present invention relates to a valve for a motor assembly for a pneumatic tool.

SUMMARY

In another embodiment, the invention provides a valve arrangement including an inlet conduit defining an inlet passage adapted for communication with a supply of pressurized motive fluid, a first planar surface spaced radially from the inlet conduit, first and second supply passages communicating through the first planar surface, and a rotary valve. The rotary valve includes a second planar surface abutting against the first planar surface and a valve passage communicating through the second planar surface. The rotary valve is rotatable to place the inlet passage in communication with a selected one of the first and second supply passages through the valve passage, and is adapted to conduct the pressurized motive fluid from the inlet passage to the selected one of the first and second supply passages. The valve arrangement also includes a housing surrounding the inlet conduit and rotary valve and a valve actuator. The valve actuator extends through the housing and is movable with respect to the housing to actuate the rotary valve.

In another embodiment, the invention provides a valve arrangement including an inlet conduit defining an inlet passage adapted for communication with a supply of pressurized motive fluid, a first planar surface spaced radially from the inlet conduit, first and second supply passages communicating through the first planar surface, and a rotary valve. The rotary valve includes a second planar surface abutting against the first planar surface and a valve passage communicating through the second planar surface. The rotary valve is rotatable to place the inlet passage in communication with a selected one of the first and second supply passages through the valve passage, and is adapted to conduct the pressurized motive fluid from the inlet passage to the selected one of the first and second supply passages. The valve arrangement also includes a first power reduction port in which the rotary valve is rotatable to a power reduction position in which the first power reduction port at least partially communicates with at least one of the valve passage, first supply passage, and second supply passage to cause a portion of motive fluid to bypass one of the first and second supply passages.

In another embodiment, the invention provides a valve arrangement including an inlet conduit having an exterior surface and an inlet passage adapted for communication with a supply of pressurized motive fluid, the inlet passage communicating through the exterior surface. First planar surfaces are spaced radially from the inlet conduit. First and second supply passages communicate through the first planar surface. The valve arrangement also includes a rotary valve including opposite first and second ends, a primary bore surrounding the exterior surface of the inlet conduit and extending between the first and second ends, a counter bore in the first end, a biasing surface defined between the primary bore and the counter bore in the first end, a second planar surface defined in the second end, and a valve passage communicating between the primary bore and the second planar surface. A seal is between the exterior surface of inlet conduit and the counter bore, and a biasing chamber is defined between the seal and the biasing surface. At least one biasing passage communicates between the inlet passage and the biasing chamber to expose the biasing surface to pressure from the pressurized motive fluid. The biasing passage is separate from the valve passage. The rotary valve is rotatable to place the inlet passage in communication with a selected one of the first and second supply passages through the valve passage, and is adapted to conduct the pressurized motive fluid from the inlet passage to the selected one of the first and second supply passages. Pressure acting on the biasing surface biases the second planar surface against the first planar surface to resist motive fluid leakage between the first and second planar surfaces.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
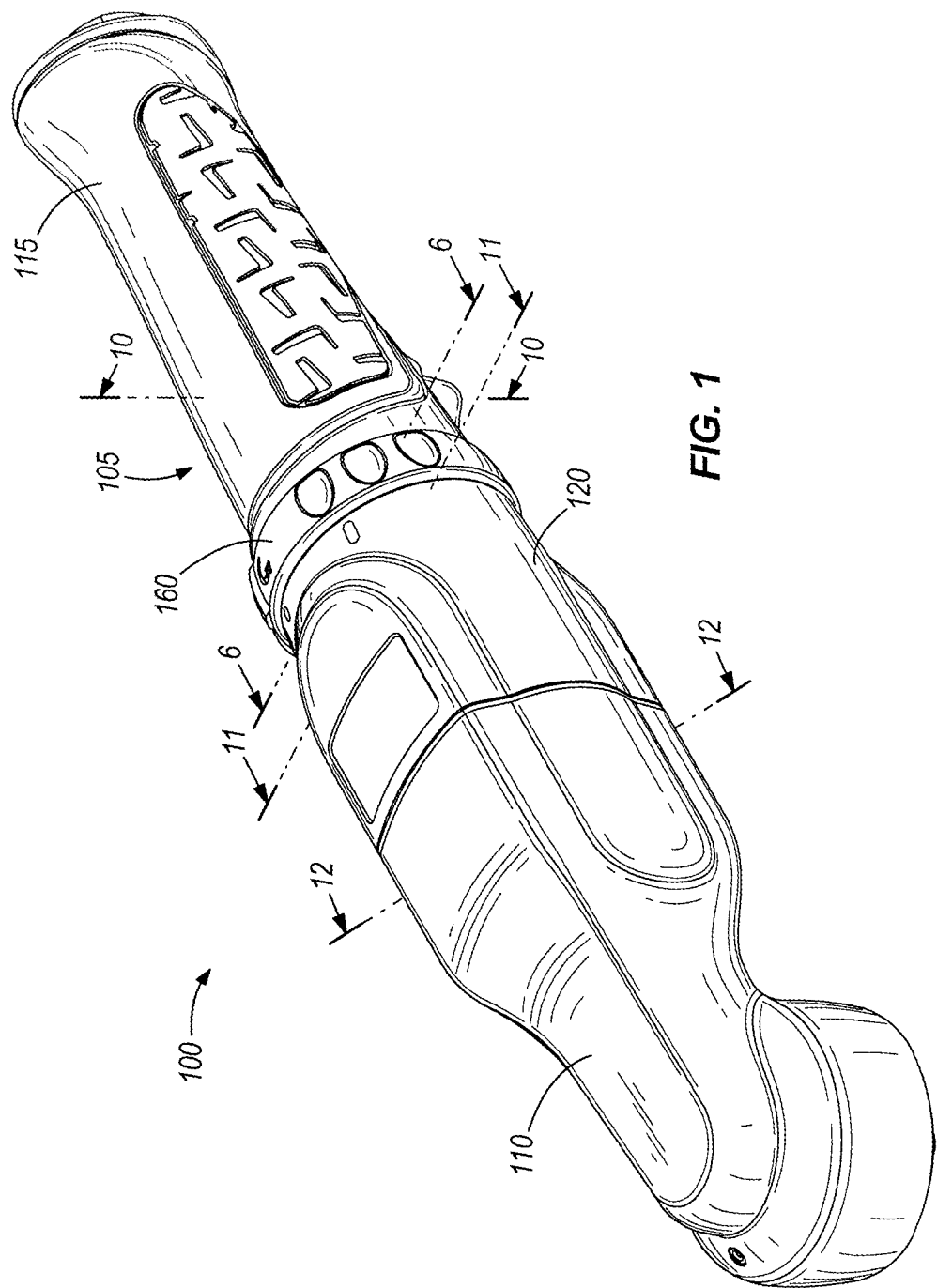
FIG. 1 is a perspective view of a pneumatic tool embodying the invention.

FIG. 1 illustrates a pneumatic tool 100 that includes a handle or motor assembly 105 and a work attachment 110. The illustrated work attachment 110 is an angle head with a square drive 113 (see FIGS. 6 and 11) to which a socket or other fastener-driving output element may be connected, but may in other constructions be substantially any tool adapted to be driven by a rotating output shaft of the motor assembly, including but not limited to an impact wrench, gear reducer, and the like.

Figure 2:
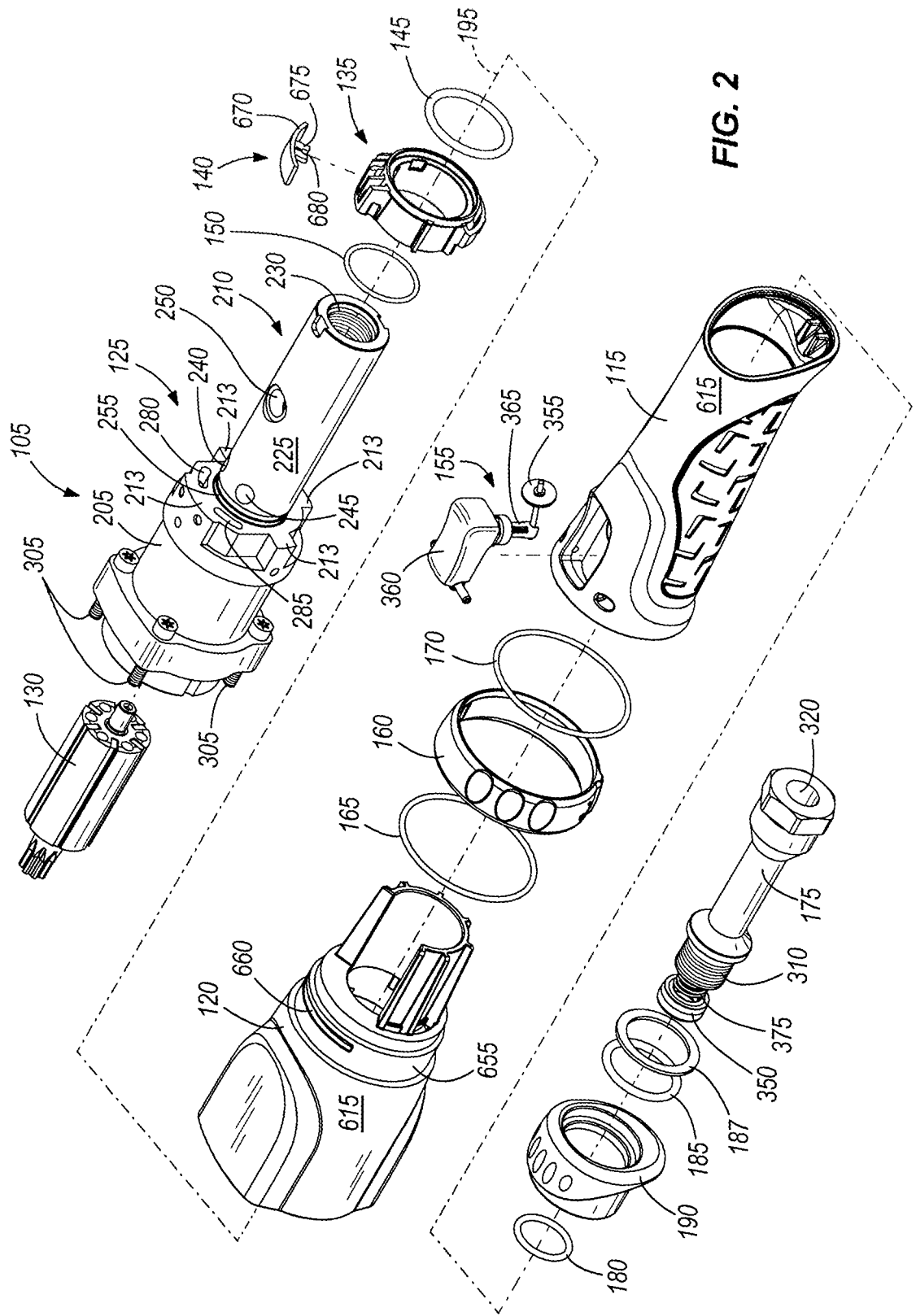
FIG. 2 is an exploded view of the handle assembly of the tool.

With reference to FIG. 2, the handle assembly 105 includes a rear housing 115, a front housing 120, a motor cylinder 125, a motor rotor 130, a rotary valve 135, a valve actuator 140, first and second valve seals 145, 150, a throttle mechanism 155, a ring 160, first and second ring seals 165, 170, an inlet bushing 175, first and second inlet seals 180, 185, an inlet washer 187 and an exhaust cap 190, along with other parts, subparts, and aspects that will be identified later. The front and rear housings 120, 115 cooperate to define an outer housing having an internal cavity in which the majority of the other elements of the handle or motor assembly 105 are housed. The handle assembly 105 includes a handle or motor longitudinal axis 195 (also called the "main axis" in this description, see also FIG. 7), and the motor cylinder 125, motor rotor 130, rotary valve 135, inlet bushing 175, and exhaust cap 190 are arranged along the handle longitudinal axis within the internal cavity of the outer housing 120, 115.

Figure 3:
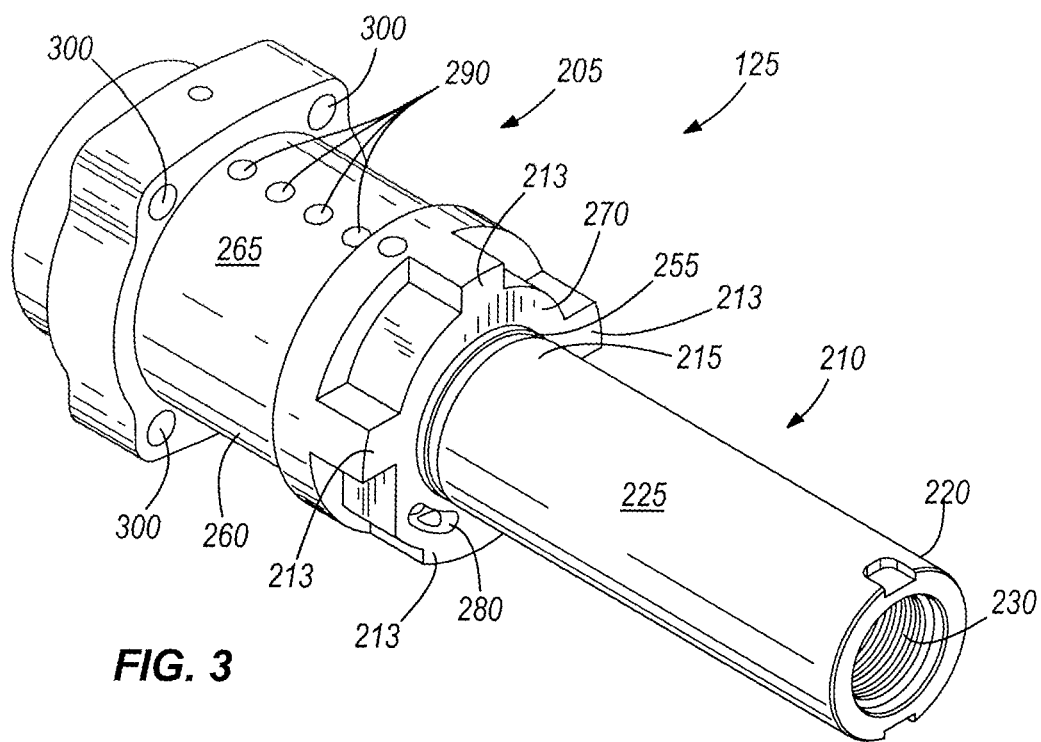
FIG. 3 is an enlarged perspective view of a motor cylinder of the handle assembly.

FIGS. 2 and 3 illustrate the motor cylinder 125, which includes a motor chamber portion 205 and an inlet conduit portion 210 integrally formed as a single piece. In the illustrated embodiment, the motor chamber portion 205 and inlet conduit portion 210 are generally cylindrical in shape. Four housing support projections 213 are integrally formed in the motor chamber portion 205 at the junction with the inlet conduit portion 210.

The motor chamber portion 205 includes a motor chamber longitudinal axis that is collinear with the main axis 195, and the inlet conduit portion 210 includes an inlet longitudinal axis or inlet axis that is also collinear with the main axis 195. The motor chamber portion 205 has a larger diameter than the inlet conduit portion 210. In other embodiments, the motor chamber portion 205 and inlet conduit portion 210 may be shaped other than illustrated.

The inlet conduit portion 210 includes a proximal end 215 integrally formed with the motor chamber portion 205 at a junction, an opposite distal end 220, and an exterior surface 225 extending between the proximal and distal ends 215, 220. An inlet passage 230 communicates with the distal end 220 (where it includes internal threads, as illustrated), extends substantially the entire length of the inlet conduit portion 210, and terminates at the proximal end 215. As used herein, a passage or port is said to "communicate" with or through a structure (e.g., the distal end 215 in the case of the inlet passage 230 or the exterior surface 225 or other surface in the case of other passages and ports described below) when it defines an aperture in the structure, and is said to communicate with another passage or port when it permits fluid flow into the other passage or port. The inlet passage 230 extends along and has a longitudinal axis collinear with the main axis 195. Communicating with the inlet passage 230 through the exterior surface 225 are a forward port 240, a reverse port 245, and a throttle port 250. A seal seat 255 is formed in and extends around the entire outer diameter of the exterior surface 225 of the inlet conduit portion 210 near the proximal end 215.

The motor chamber portion 205 of the motor cylinder 125 includes a motor chamber wall 260 that has an exterior surface 265 and that defines a first substantially planar surface 270 extending radially away from the proximal end 215 of the inlet conduit portion 210 at the junction. The first planar surface 270 surrounds the proximal end 215 and is consequently generally ring-shaped. The motor chamber wall 260 also defines a motor chamber 275 (FIGS. 7 and 8) in which the motor rotor 130 is supported for rotation about a rotor axis that is collinear with the main axis 195. Formed in the motor chamber wall 260 are a forward supply passage 280, a reverse supply passage 285, and a plurality of exhaust ports 290. The forward and reverse supply passages 280, 285 communicate between the first planar surface 270 and the motor chamber 275, and the exhaust ports 290 communicate between the motor chamber 275 and the exterior surface 265 of the motor chamber portion 205. The end of the motor chamber portion 205 opposite the first planar surface 270 has a plurality of cylinder mounting holes 300 that receive a plurality of fasteners 305 for securing the work attachment 110 to the motor cylinder 125. In this regard, the end of the motor chamber portion 205 acts as a mounting flange.

Figure 7:
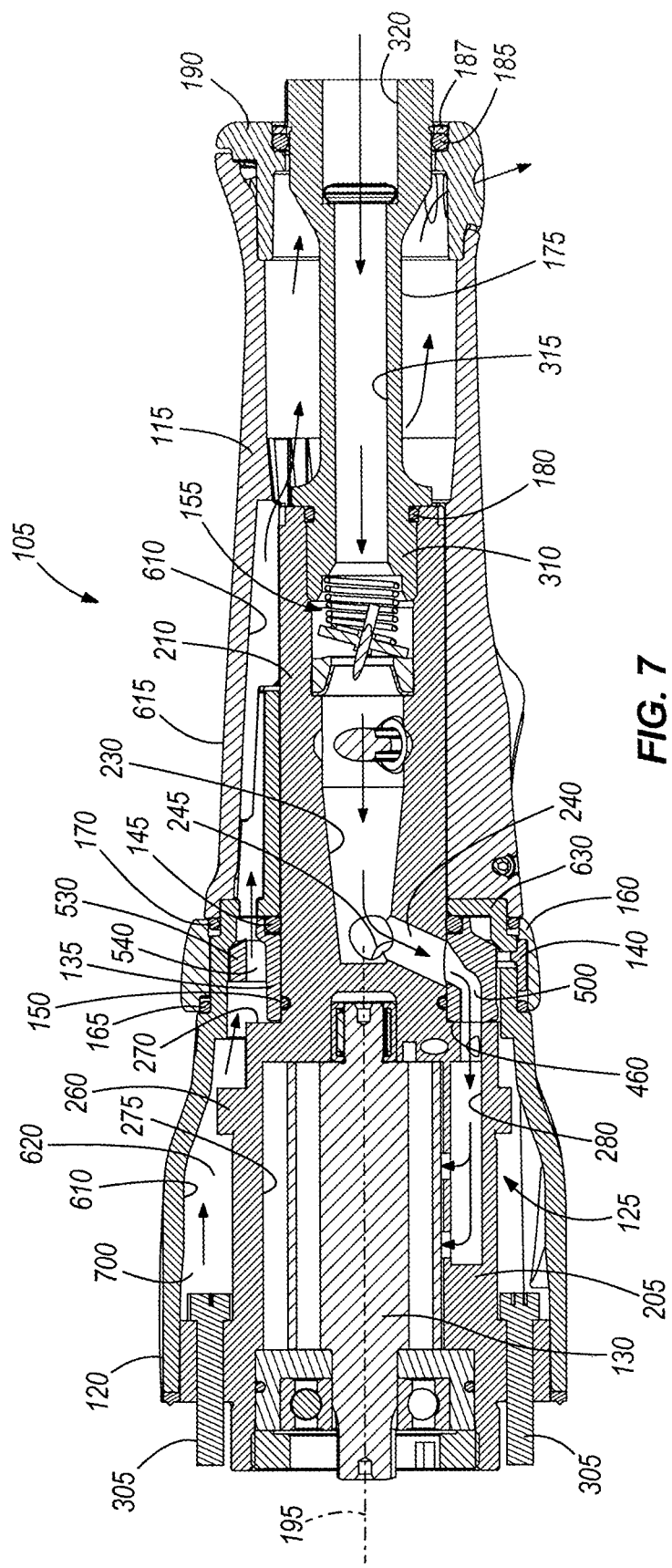
FIG. 7 is a cross-sectional view taken along line 7-7 in FIG. 6.

With reference to FIGS. 2 and 7, the inlet bushing 175 includes external threads 310 at one end that thread into the internal threads of the inlet passage 230 at the distal end 220 of the inlet conduit portion 210. The first inlet seal 180 provides a seal between the inlet conduit portion 210 and the inlet bushing 175. At the end opposite the external threads 310, the inlet bushing 175 is sealed within the exhaust cap 190 with the second inlet seal 185. The inlet bushing 175 defines a bushing passage 315 that communicates with the inlet passage 230. The inlet bushing 175 and bushing passage 315 define a bushing longitudinal axis that is collinear with the main 195. The inlet bushing 175 provides a fitting 320 that is adapted to mate with a fitting on a source of motive fluid (e.g., the outlet fitting on a supply hose providing compressed air, nitrogen, or another compressible fluid) supplied under pressure from a source, and conduct the motive fluid through the bushing passage 315 to the inlet passage 230. The inlet conduit portion 210, inlet passage 230, inlet bushing 175, and bushing passage 315 include longitudinal axes that are parallel to and substantially collinear with the main axis 195.

Figure 10:
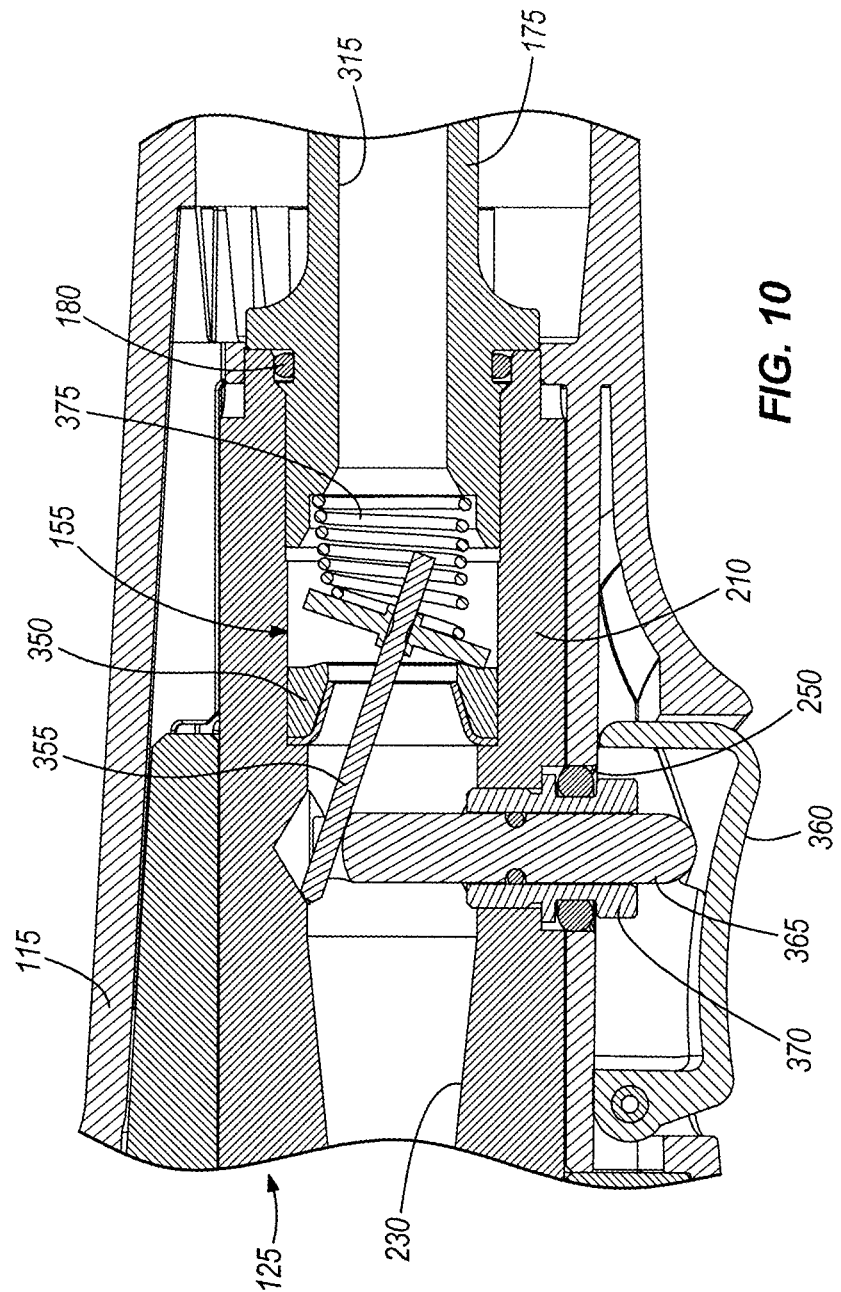
FIG. 10 is a cross-sectional view of the tool taken along line 10-10 in FIG. 1.

With reference to FIGS. 2 and 10, the throttle mechanism 155 includes a throttle seat 350 in a reduced-diameter portion of the inlet passage 230, and a "tip" style valve 355 that sits in the throttle seat 350. The throttle mechanism 155 also includes a trigger 360 mounted to the rear housing 115, and a throttle pin or actuator 365 extending between the trigger 360 and tip style valve 355 through a throttle bushing 370 in the throttle port 250. The throttle bushing 370 provides a seal around the throttle actuator 365 to resist the escape of motive fluid from the inlet passage 230 through the throttle port 250. The throttle actuator 365 moves linearly in the throttle bushing 370 in response to actuation of the trigger 360, and tips the tip style valve 355 with respect to the throttle seat 350, which opens communication between the bushing passage 315 and the inlet passage 230. When the tip style valve 355 is open, a pressurized supply of motive fluid rushes into the inlet passage 230 to drive operation of the tool 100. When the trigger 360 is released, the pressurized motive fluid, assisted by a spring 375, causes the tip style valve 355 to automatically re-seat itself and shut off the flow of motive fluid into the inlet passage 230.

Figure 5:
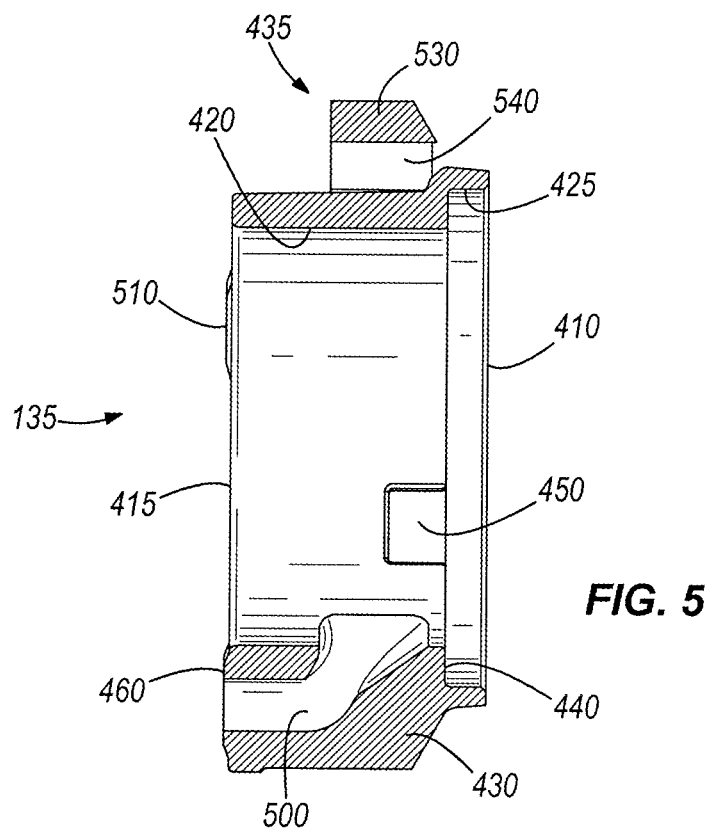
FIG. 5 is a cross-sectional view of the rotary valve taken along line 5-5 in FIG. 4A.
Figure 4A:
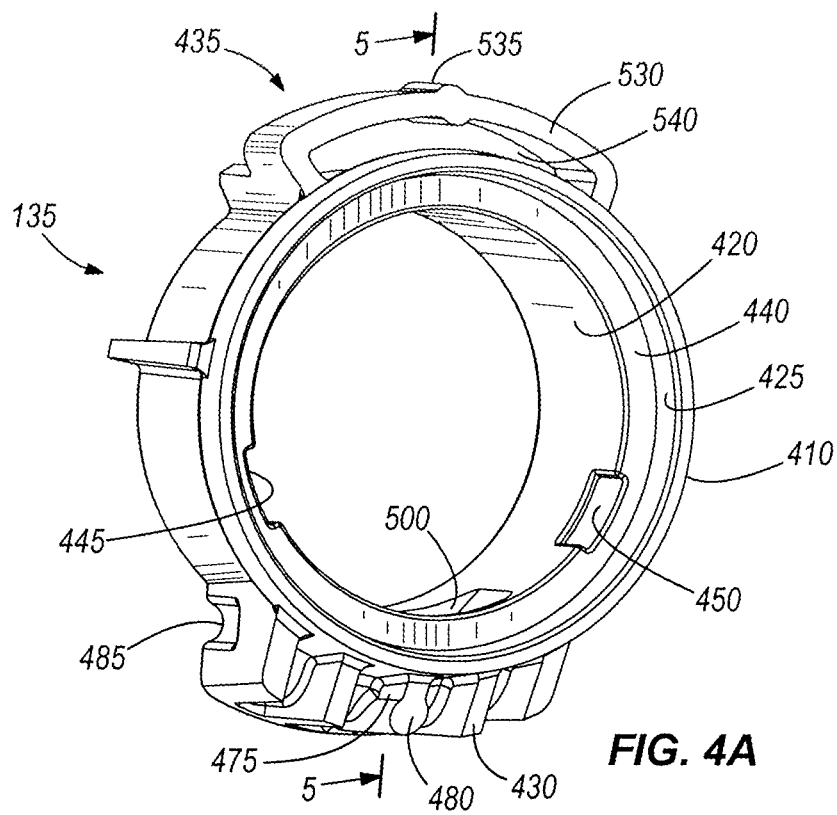
FIG. 4A is a rear perspective view of a rotary valve of the handle assembly.
Figure 4B:
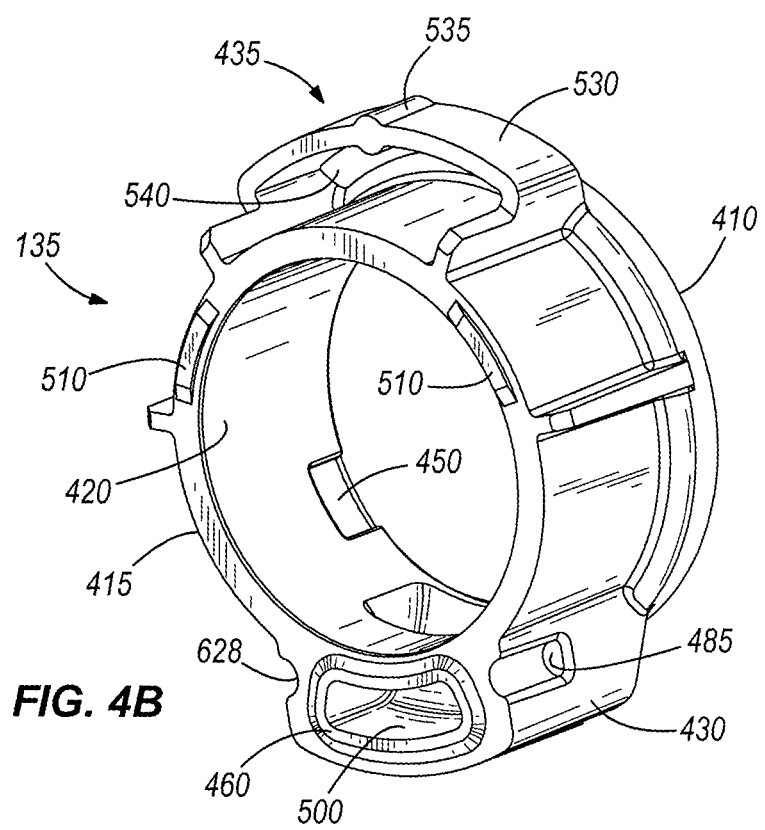
FIG. 4B is a front perspective view of the rotary valve.

FIGS. 4A, 4B, and 5 illustrate the rotary valve 135, which is generally ring-shaped, and which includes first and second ends 410, 415, a primary bore 420 extending between the first and second ends 410, 415, a counter bore 425 in the first end 410, an enlarged structural portion 430, and a resilient deflectable member 435. The entire rotary valve 135 is integrally formed as a single integral part in the illustrated embodiment.

A ring-shaped pressure biasing surface 440 is defined by the step between the primary bore 420 and the counter bore 425 at the first end 410. Forward and reverse undercuts or open channels 445, 450 in the primary bore 420, acting in conjunction with the exterior surface 225 of the inlet conduit portion 210 when assembled, define forward and reverse biasing passages that intersect the pressure biasing surface 440.

The enlarged structural portion 430 defines a second planar surface 460 at the second end 415 of the rotary valve 135, a mounting finger 475 with an enlarged head 480, and a forward power reduction ("FPR") port or groove 485. Extending through the enlarged structural portion 430 is a valve passage 500. The valve passage 500 communicates between the primary bore 420 and the second planar surface 460. A pair of stabilizing protrusions 510 are provided in the second end 415 of the rotary valve 135, and provide flat surfaces that are co-planar with each other and with the second planar surface 460.

The rest of the second end 415 is recessed with respect to the co-planar surfaces of the protrusions 510 and the second planar surface 460, and the three co-planar surfaces provide a three-legged riding surface for the second end 415 of the rotary valve 135 against the first planar surface 270. That is why there is a gap between the second end 415 and the first planar surface 270 in the cross-section views in the drawings (see, for example, FIGS. 8 and 9, and the top of the rotary valve 135 in FIG. 7) except where the protrusions 510 or second planar surface 460 contact the first planar surface 270.

The resilient deflectable member 435 includes a relatively thin-walled cross piece 530 with a detent protrusion 535 with a smooth partially-spherical surface. The cross piece 530 extends over an exhaust path aperture 540 in the rotary valve 135.

Figure 6:
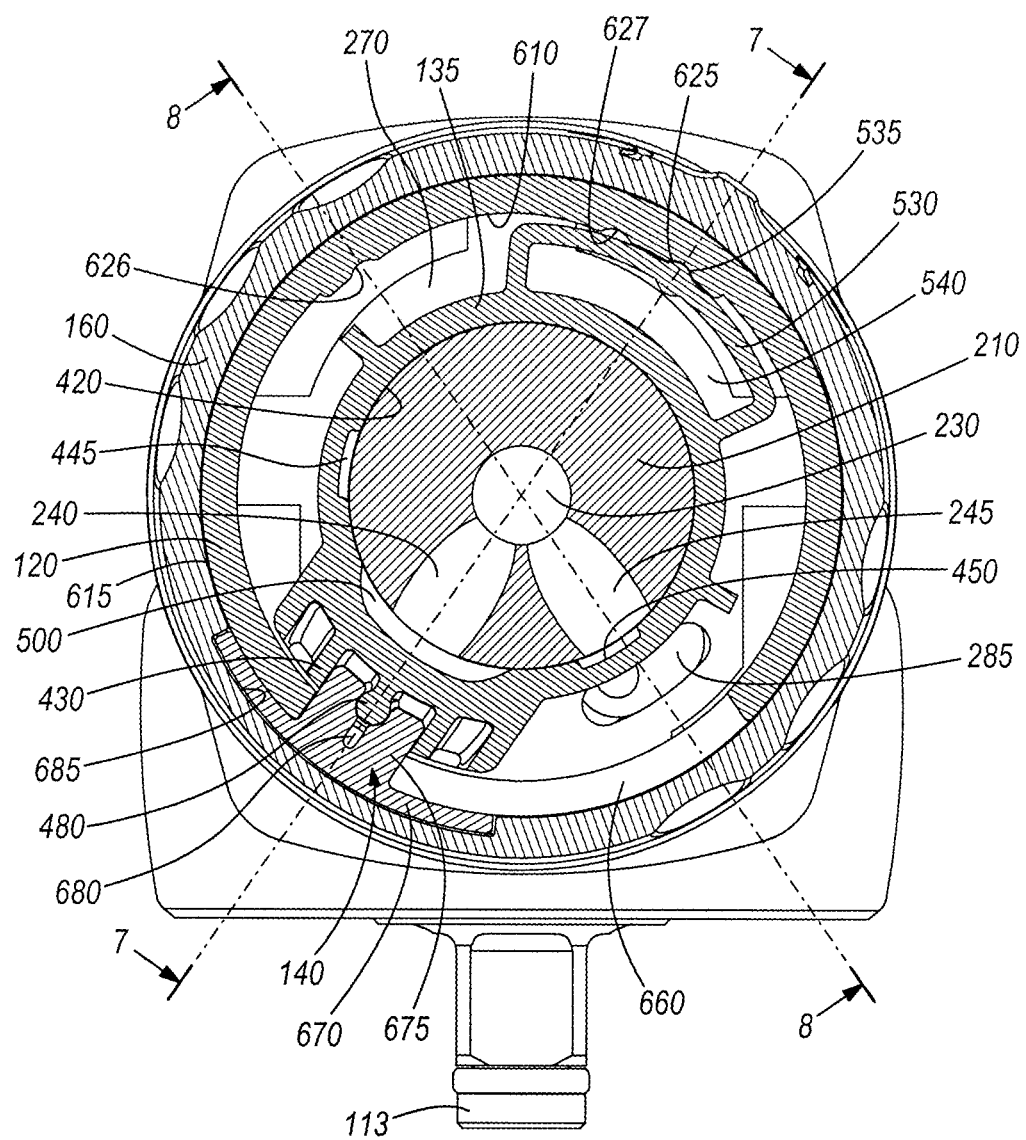
FIG. 6 is a cross-sectional view of the tool taken along line 6-6 in FIG. 1.

Referring now to FIG. 6, the primary bore 420 of the rotary valve 135 fits with close tolerances around the exterior surface 225 of the inlet conduit portion 210 of the motor cylinder 125, with the second planar surface 460 against the first planar surface 270. The primary bore 420 covers the forward and reverse ports 240, 245. The rotary valve 135 is supported for rotation about the exterior surface 225 of the inlet conduit portion 210 between a forward position, a reverse position, and a forward power regulation ("FPR") position in between the forward and reverse positions. The rotary valve 135 is illustrated in the forward position in FIG. 6.

Figure 9:
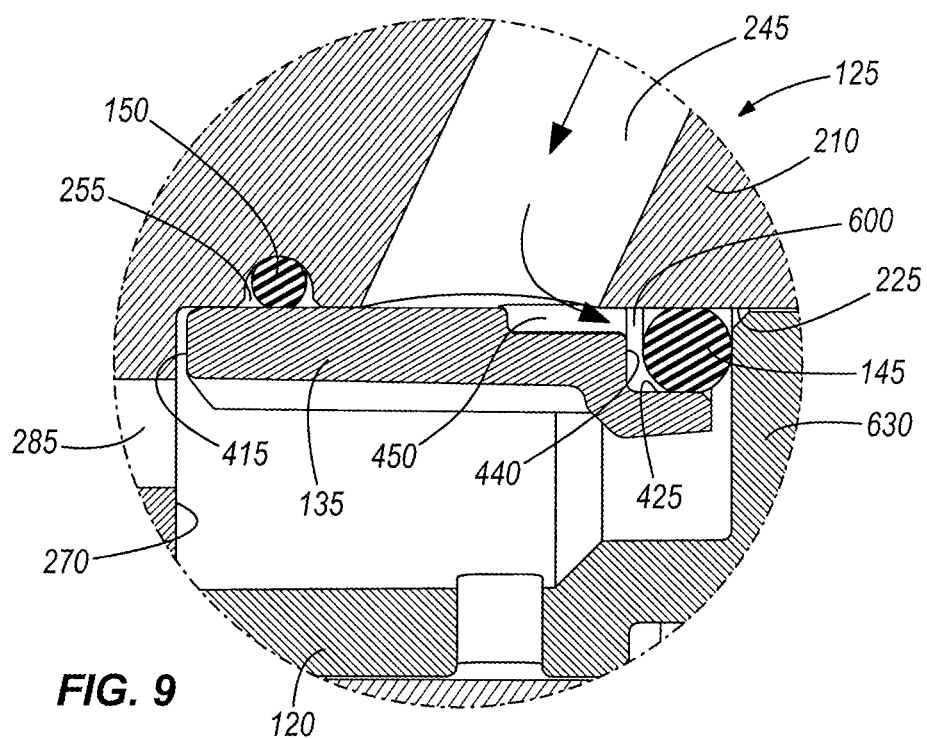
FIG. 9 is an enlarged view of the portion encircled in FIG. 8.

When the rotary valve 135 is in the forward position (as illustrated), the valve passage 500 communicates between the forward port 240 and the forward supply passage 280, and the reverse biasing passage 450 communicates with the reverse port 245. With additional reference to FIG. 7, when the rotary valve 135 in the forward position and the throttle mechanism 155 is actuated, motive fluid flows from the inlet passage 230, through the forward port 240, through the valve passage 500, through the forward supply passage 280, and to the motor chamber 275 where it expands and causes the rotor 130 to rotate in a forward direction. At the same time, motive fluid flows from the inlet passage 230, through the reverse port 245, through the reverse biasing passage 450, and into a biasing chamber 600 (FIG. 9, explained in detail below).

When the rotary valve 135 is in the reverse position, the valve passage 500 communicates between the reverse port 245 and the reverse supply passage 285, and the forward biasing passage 445 communicates with the forward port 240. With the rotary valve 135 in the reverse position, motive fluid flows from the inlet passage 230, through the reverse port 245, through the valve passage 500, through the reverse supply passage 285, and to the motor chamber 275 where it expands and causes the rotor 130 to rotate in a reverse direction (opposite the forward direction). At the same time, motive fluid flows from the inlet passage 230, through the forward port 240, through the forward biasing passage 445, and into the biasing chamber 600.

Figure 11:
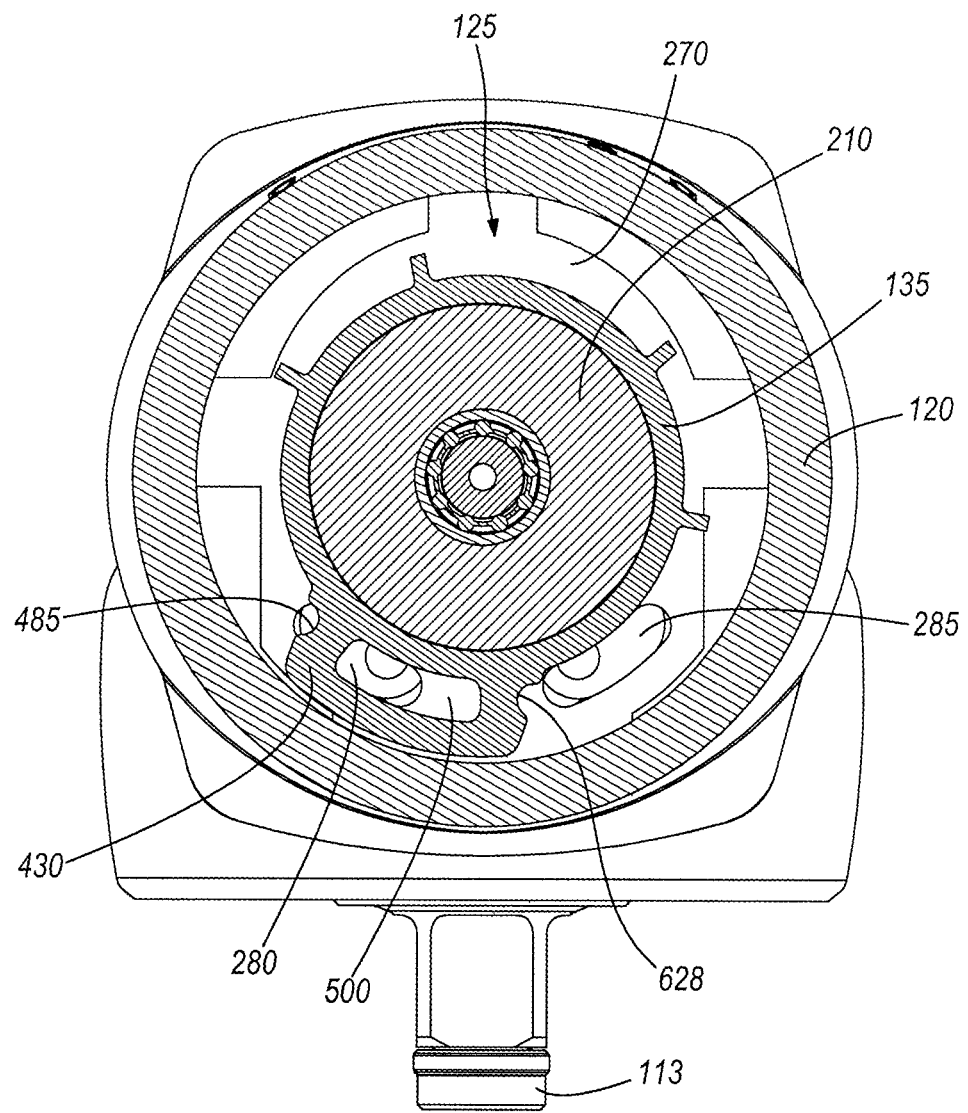
FIG. 11 is a cross-sectional view of the tool taken along line 11-11 in FIG. 1, with the rotary valve in a forward power reduction position.

With additional reference to FIG. 11, when the rotary valve 135 is in the FPR position, the valve passage 500 only partially aligns with the forward supply passage 280, and the FPR port 485 is also placed in communication with the forward supply port 280. Consequently, the flow of motive fluid into the motor chamber 275 is limited because some of the motive fluid flows out the FPR port into the exhaust passages (discussed in more detail below) without flowing into the motor chamber 275. In this regard, the FPR port may be termed a motor chamber bypass port as well, because it causes motive fluid to flow to exhaust without first flowing through the motor chamber 275. When the rotary valve 135 is in FPR position, the power of forward rotation of the rotor 130 is reduced, and torque applied by the tool 100 on a work piece is reduced. In the FPR position, the reverse biasing passages 450 still communicates between the reverse port 245 and the biasing chamber 600.

The outer housing 120, 115 includes an interior or inner surface 610 (i.e., facing the motor cylinder 125, valve 135, and bushing 175, see FIGS. 6 and 7) and an exterior or outer surface 615 (i.e., facing away from the motor cylinder 125, valve 135, and bushing 175, see FIGS. 2 and 7). As seen in FIG. 7, an exhaust passage 620 is defined between the inner surface 610 of the outer housing 115, 120 and the exterior surfaces 225, 265 of the motor cylinder 125 and bushing 175. A majority of the exhaust passage 620 extends substantially parallel to the main axis 195 to conduct exhausted motive fluid in a direction that is parallel to, but opposite the direction of motive fluid flowing into the tool 105, from the motor chamber 275 to the exhaust cap 190. A portion of the exhaust passage 620 extends through and is defined by the exhaust path aperture 540 in the rotary valve 135, and the exhaust passage 620 surrounds the rotary valve 135.

The inner surface 610 of the front housing 120 includes forward, reverse, and FPR detent grooves 625, 626, 627 into which the detent protrusion 535 of the deflectable member 435 of the rotary valve 135 is resiliently received when the rotary valve 135 is in the respective forward, reverse, and FPR positions. The detent protrusion 535 and detent grooves 625, 626, 627 together define a detent mechanism that resiliently holds the rotary valve 135 in the forward, reverse, and FPR positions (i.e., selected operating positions). In other embodiments, this arrangement may be reversed (e.g., with the deflectable member 435 on the front housing 120 and the detent grooves 625, 626, 627 on the rotary valve 135) or a different mechanism may be used.

While the illustrated embodiment provides only forward, reverse, and FPR detent grooves 625, 626, 627, other embodiments may include additional detent grooves to resiliently retain the rotary valve 135 in multiple FPR positions. Multiple FPR positions would permit the FPR port 485 to only partially register with the forward supply port 280, to restrict the amount of motive fluid that bypasses the motor chamber 275. One or more additional detent grooves may be provided to register a reverse power regulation ("RPR") port 628 (see FIGS. 4B and 11) with the reverse supply port 285 to bypass the motor chamber 275 and limit the reverse output in the same way as the FPR port 485 does in forward operation.

Figure 8:
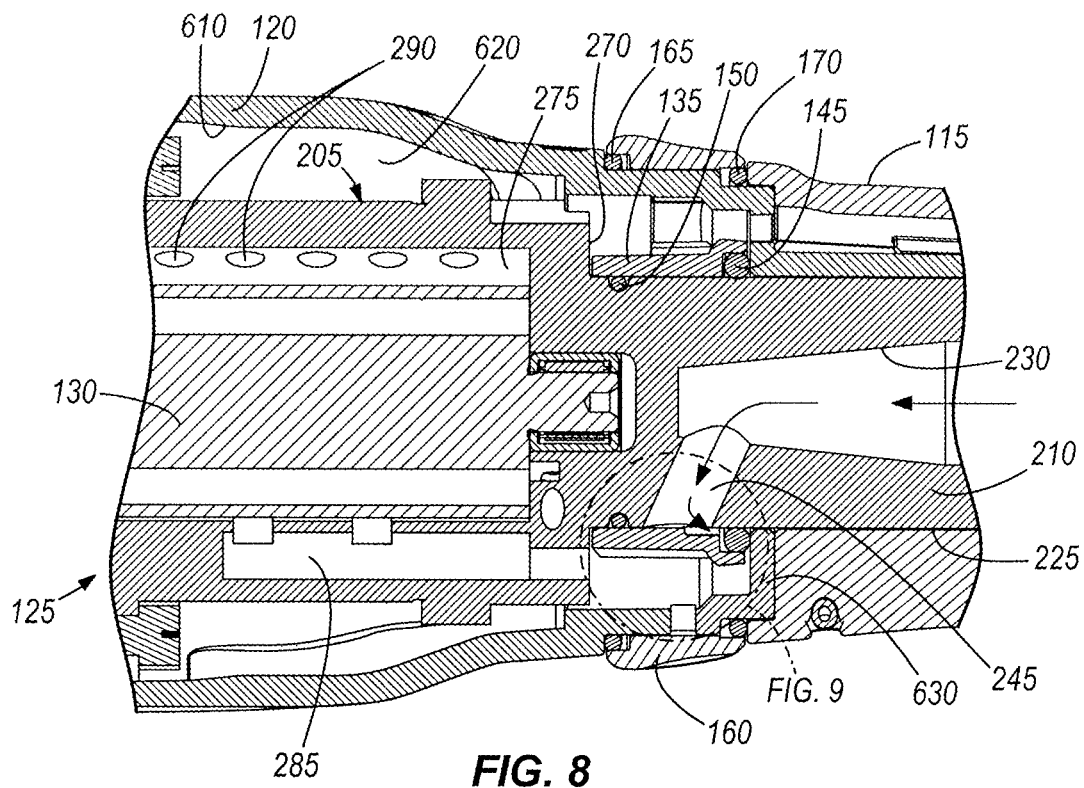
FIG. 8 is a cross-sectional view taken along line 8-8 in FIG. 6.

As seen in FIGS. 7-9, the first and second valve seals 145, 150 create a seal between the respective first and second ends of the rotary valve 135 and the exterior surface 225 of the inlet conduit portion 210. The first valve seal 145 extends around the exterior surface 225 of the inlet conduit portion 210 and sits between the exterior surface 225 and the counter bore 425. The second valve seal 150 is received within the seal seat 255 of the inlet conduit portion 210.

With additional reference to FIG. 9, the pressure biasing chamber 600 is defined between the first valve seal 145, the counter bore 425, the pressure biasing surface 440, and the exterior surface 225 of the inlet conduit portion 210. The first valve seal 145 includes a first face facing toward and at least partially defining the biasing chamber 600, and a second face facing away from and not defining any portion of the biasing chamber 600. A depending portion 630 of the front housing 120 abuts the second face of the first valve seal 145, but the pressure biasing chamber 600 is not bounded at all by any portion of the outer housing 115, 120.

In the biasing chamber 600, the pressure of the motive fluid (whether supplied through the forward or reverse biasing passage 445, 450) forces the second face of the first seal 145 against the depending portion 630 of the front housing 120, but the pressure does not apply a direct force against the front housing 120 (only indirectly through the first seal 145). The pressure is also applied to the pressure biasing surface 440 to give rise to a biasing force that urges the rotary valve 135 forward (i.e., to the left in FIGS. 7-9) to hold the second planar surface 460 (at the second end 415 of the rotary valve 135) tightly against the first planar surface 270.

A face seal arises between the first and second planar surfaces 270, 460 to resist the loss or leakage of motive fluid between the first and second planar surfaces 270, 460. Because the second planar surface 460 does not extend around the entire circumference of the second end 415 of the rotary valve 135, the biasing force is concentrated on the rotary valve second planar surface 460 and the two stabilizing protrusions 510. This provides a smaller surface area for transferring the biasing force to the first planar surface 270 than if the second planar surface extended around the entire circumference of the second end 415 of the rotary valve 135, and consequently a higher pressure applied by the second planar surface 460 against the first planar surface 270 and a better seal. The face seal is also advantageous because it does not include sealing members that will wear down during repeated actuation of the rotary valve 135; instead the smooth planar surfaces 270, 460 slide with respect to each other without significant wear. Thus, substantially all motive fluid flowing through the valve passage 500 and into the forward and reverse supply passages 280, 285 reaches the motor chamber 275 (unless the rotary valve 135 is in the FPR position in which some of the motive fluid is vented to exhaust intentionally). Leakage from the interface between the valve passage 500 and forward and reverse supply passages 280, 285 due to motive fluid flowing between the first and second planar surfaces 270, 460 is minimized or completely eliminated.

With reference to FIGS. 2 and 6, a ring seat 655 is formed in the outer surface 615 of the front housing 120. The ring 160 is supported in the ring seat 655 for rotation about the front housing 120. The ring 160 rotates about an axis of rotation that is collinear with the main axis 195.

A slot 660 (FIGS. 2 and 6) is formed in the ring seat 655. The valve actuator 140 includes an actuator head 670 and a stem 675. The stem 675 extends through the slot 660 in the ring seat 655 and includes a deflectable slot 680 that is sized to snap-fit around the enlarged head 480 of the mounting finger 475 of the rotary valve 135 to releasably interconnect the valve actuator 140 to and valve 135. In other embodiments, the finger and expandable slot 475, 680 may be reversed such that the stem 675 includes the enlarged head 480 and the rotary valve 135 includes the expandable slot 680. The present invention provides an interface that is simple to assemble or disassemble by hand, with no need for any tools. Currently-known and practiced constructions for reversing switches require a screwdriver, allen wrench, or like tool to assemble the valve actuator. While the illustrated snap-fit configuration is one embodiment of the present invention, other constructions and embodiments may include other means for interconnecting the rotary valve with a valve actuator by hand and without the use of tools.

The ring 160 includes a recess 685 ribs or other abutment surfaces that engage the opposite sides of the actuator head 670, and the ring 160 covers the valve actuator 140. The user interface to control forward, reverse, and FPR operation of the tool 100 is therefore the ring 160. Because the ring 160 covers the actuator head, it eliminates any visible or exposed connection interface (e.g., a screw) which can be unsightly or become loosened during tool use. Enclosing the actuator head 670 within the ring 670 also reduces the likelihood of accidental disengagement of the valve actuator 140 from the rotary valve 135.

An operator toggles the tool 100 between the forward, reverse, and FPR operations by rotating the ring 160 in one direction or the other, which overcomes the detent force of the detent mechanism (detent protrusion 535 and detent grooves 625, 626, 627) and causes the actuator head 670 to slide along the outer surface 615 of the front housing 120. This in turn causes movement of the rotary valve 135 through the stem 675. Rotating the ring 160 thereby switches direction of operation of the tool 100. The operator is rewarded with a tactile feedback as the detent mechanism (detent protrusion 535 and detent grooves 625, 626, 627) clicks into the forward, reverse, and FPR positions.

Figure 12:
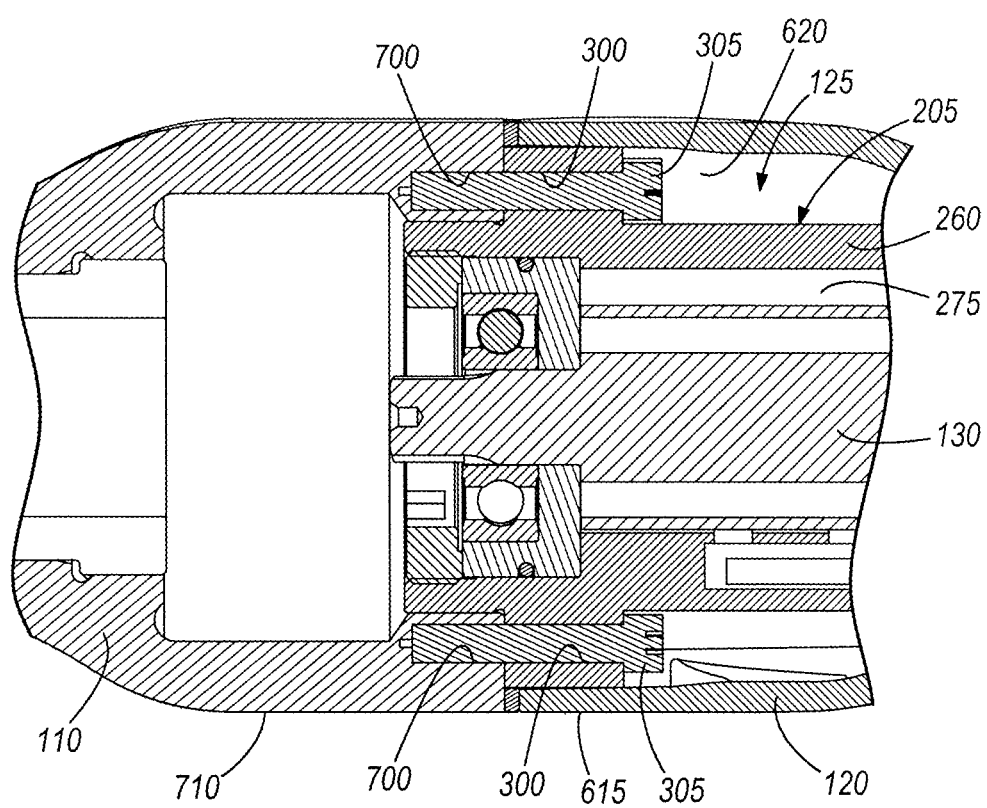
FIG. 12 is an enlarged view of the left end of the drawing of FIG. 7.

FIGS. 7 and 12 illustrate the mounting arrangement for the work attachment. The work attachment includes a plurality of attachment mounting holes 700 that align with the cylinder mounting holes 300. In the illustrated construction, the work attachment 110 is secured to the motor cylinder 125 with the fasteners 305. More specifically, the fasteners 305 extend through the cylinder mounting holes 300 and attachment mounting holes 700. In the illustrated embodiment, the attachment mounting holes 700 are internally threaded to receive an externally threaded end of the fasteners 305, and the cylinder mounting holes 300 are sized smaller than an enlarged head of the fasteners 305 so that the enlarged head bears against the flange portion of the motor cylinder 125. When mounted to the motor cylinder 125, the work attachment 110 is interconnected to the motor rotor 130 and is operable to perform work in response to rotation of the motor rotor 130.

The front housing 120 includes pockets in its interior surface 610 into which the housing support projections 213 of the motor cylinder 125 fit snugly. The interconnection of the pockets and housing support projections 213 properly locates (axially and radially) the front housing 120 with respect to the motor cylinder 125, and resists torsional loads between the front housing 120 and motor cylinder 125. A compliant gasket 710 sits between and provides a pressure tight seal between the work attachment 110 and the front housing 120 to resist leaking of exhaust motive fluid.

With the housing support projections 213 bottomed out in the pockets of the front housing 120, the front end of the outer housing extends around the flange portion of the motor cylinder 125 with a close clearance fit. The first ring seal 165, valve actuator 140, ring 160, and second ring seal 170 are then installed on the ring seat 655 portion of the front housing 120. Next the rear housing 115, exhaust cap 190, and inlet bushing 175 are assembled, with the first inlet seal 180 around the inlet bushing 175 above the threaded portion 310, and with the second inlet seal 185 and inlet washer 187 sandwiched between a portion of the inlet bushing 175 and a portion of the exhaust cap 190. The threaded end 310 of the inlet bushing 175 is threaded into the threaded portion of the inlet passage 230.

As the inlet bushing 175 is threaded into the inlet passage 230, it applies an axial thrust load on the rear housing 115 through the inlet washer 187, second inlet seal 185, and exhaust cap 190. As it is squeezed between the inlet bushing 175 and exhaust cap 190, the second inlet seal 185 provides a pressure-tight seal therebetween, and acts as a compliant member to accommodate tolerance stackups of the rigid components in the assembly. The rear housing 115 in turn applies a thrust load on the front housing 120 through a step in the rear housing 115 and the rear end of the front housing 120 (including the depending portion 630.

With work attachment 110 mounted to the motor cylinder 125 and the front housing mounted around the motor cylinder 125, the fasteners 305 are hidden from view outside of the tool 100 because they are within the work attachment 110 and the cavity bounded by the interior surface 610 of the outer housing 115, 120. Additionally, the outer surface of the work attachment 110 and the outer surface 615 of the outer housing 115, 120 are substantially aligned when the tool 100 is assembled, to create a substantially continuous tool outer surface that includes the outer surfaces of both the work attachment 110 and the outer housing 115, 120. Hiding the fasteners 305 in this manner provides a sleek appearance to the tool 100, resists tampering and disassembly of the tool, and physically shields the fasteners 305 from being caught on wires, edges, and other structures in a confined space, construction environment, or other work environment.

Figure 13:
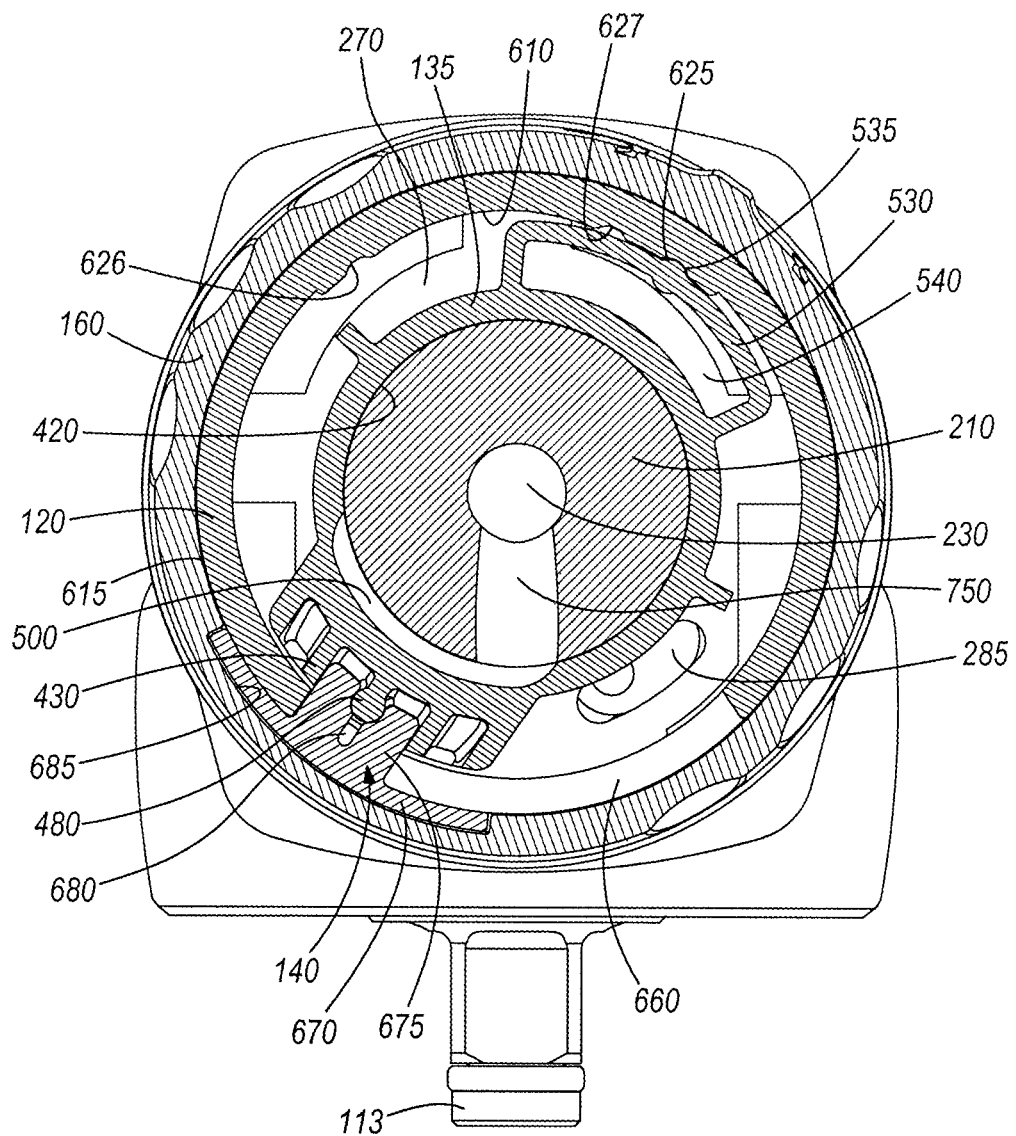
FIG. 13 is a cross-sectional view of the tool according to another embodiment of the invention.
Figure 14:
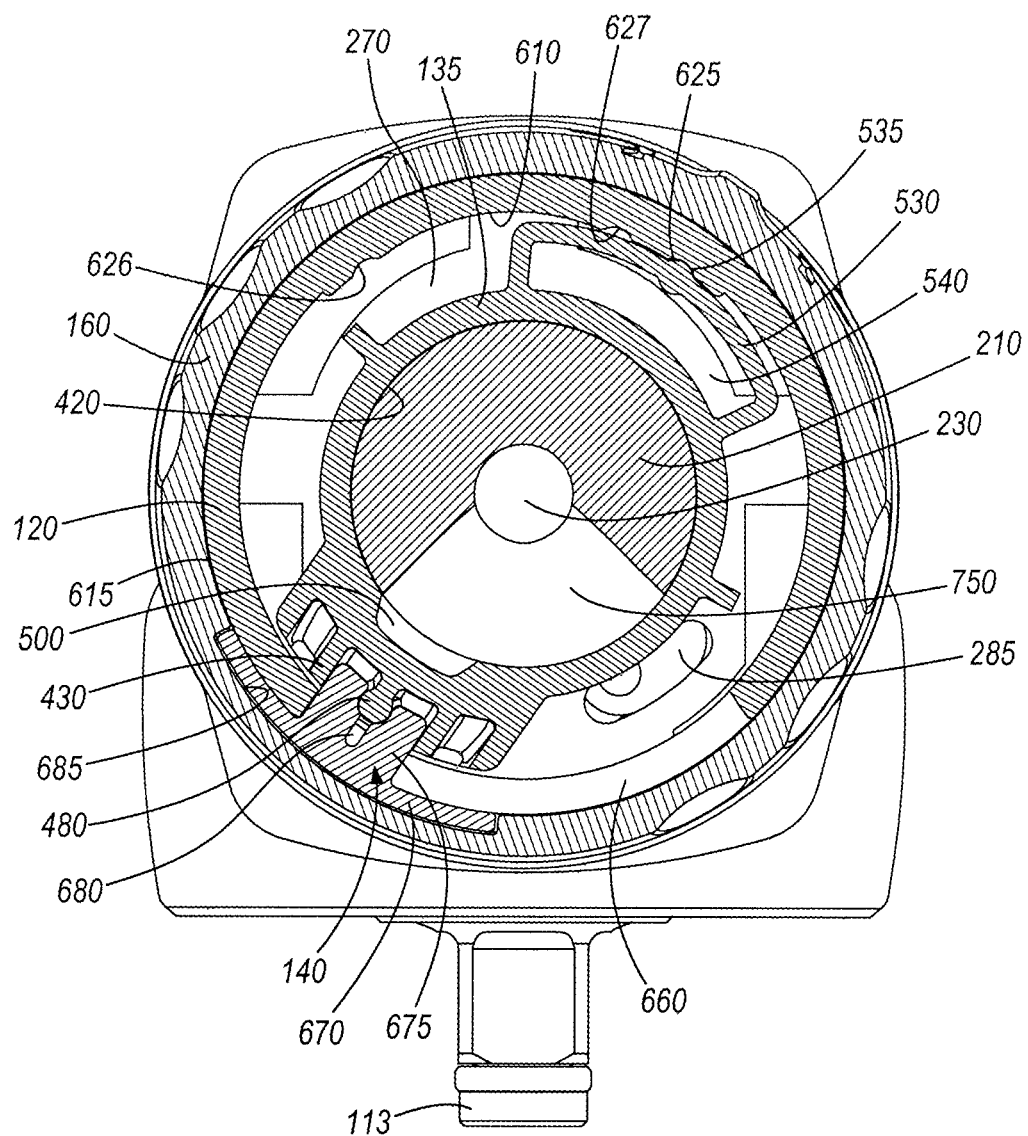
FIG. 14 is a cross-sectional view of the tool according to another embodiment of the invention.
Figure 15:
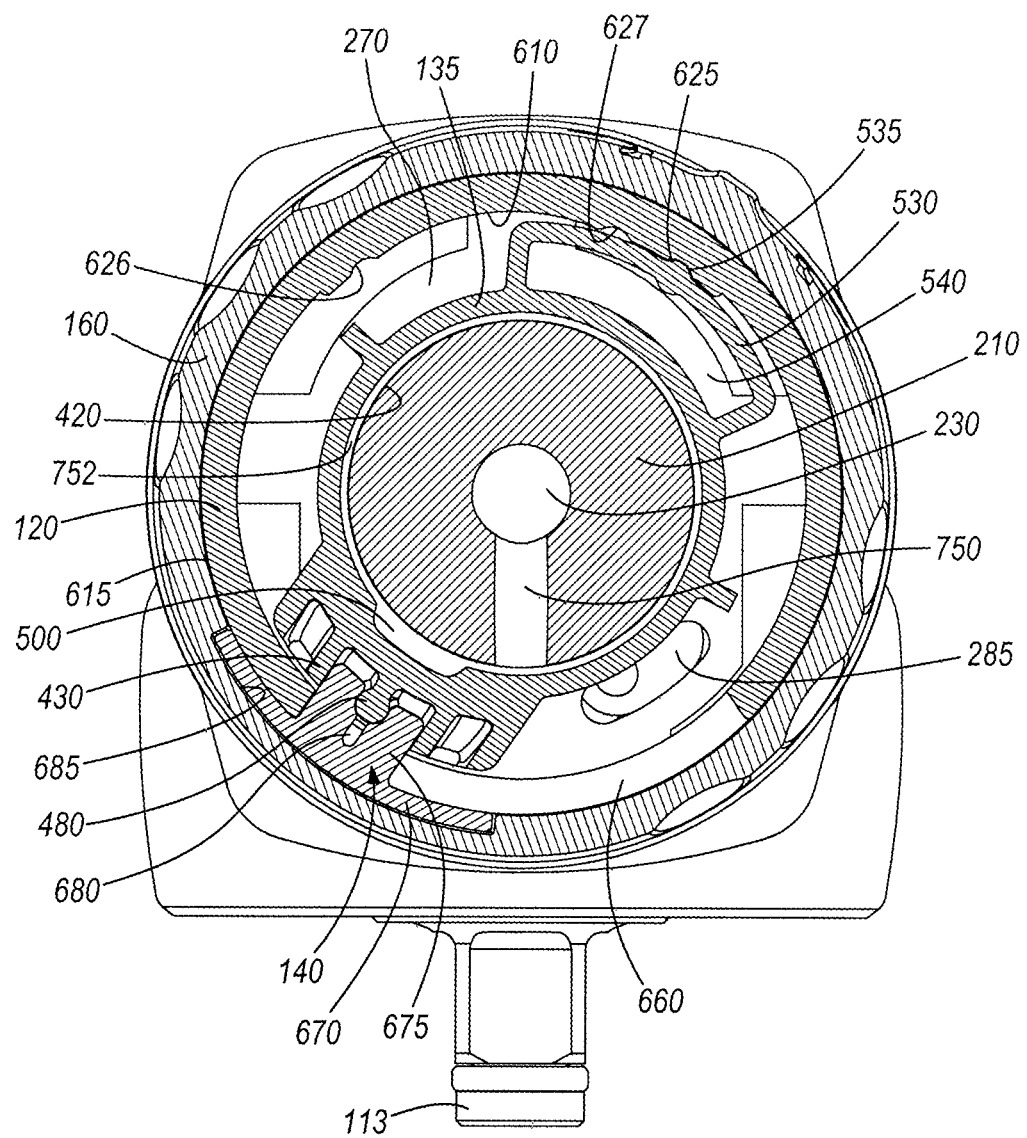
FIG. 15 is a cross-sectional view of the tool according to another embodiment of the invention.

FIGS. 13-15 include alternative embodiments of the interface between the inlet passage 230 and the rotary valve 135, in which a single supply port 750 communicates between the inlet passage 230 and the exterior surface 225 of the inlet conduit portion 210. In FIG. 13, the valve passage 500 is made large enough to stretch from the single supply port 750 to the forward supply passage 280 (i.e., with the right end of the valve passage 500 communicating with the single supply port 750 and the left end of the valve passage 500 communicating with the forward supply passage 280 as viewed in FIG. 13) when the rotary valve 135 is in the forward position, and to stretch from the single supply port 750 (i.e., at the left end of the valve passage 500 as viewed in FIG. 13) to the reverse supply passage 285 (i.e., at the right end of the valve passage 500) when the rotary valve 135 is in the reverse position.

In FIG. 14, the single supply port 750 widens at the exterior surface 225, so that the single supply port 750 stretches from the valve passage 500 in the forward position (i.e., with the valve passage 500 communicating between the forward supply passage 280 and the left end of the single supply port 750 as viewed in FIG. 14) to the valve passage 500 in the reverse position (i.e., with the valve passage 500 communicating between the reverse supply passage 285 and the right end of the single supply port 750).

In FIG. 15, the rotary valve 135 includes an annular groove in the primary bore 420 that communicates with the valve passage 500. The single supply port 750 communicates with the annular groove 752 in the primary bore 420. The valve passage 500 communicates between the annular groove 752 and the forward supply passage 280 in the forward position (as viewed in FIG. 15) and between the annular groove 752 and the reverse supply passage 285 in the reverse position.

Figure 16:
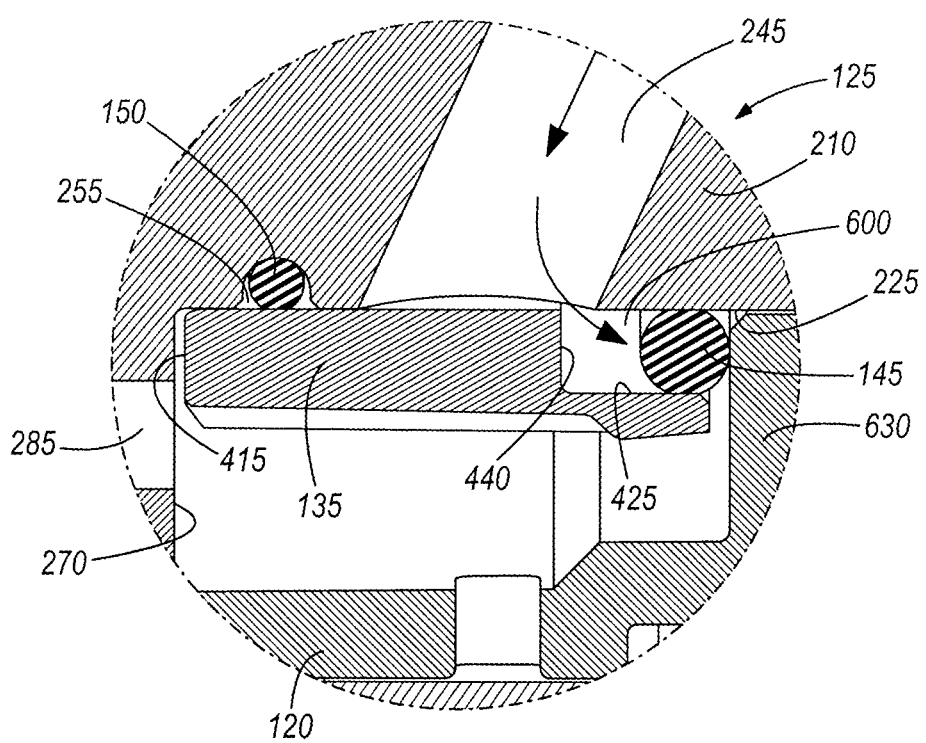
FIG. 16 is an enlarged view of a portion of the tool according to another embodiment of the invention.

FIG. 16 includes an alternate embodiment of the interface between the inlet valve 135 and the inlet conduit portion 210 forming the pressure biasing chamber 600. Rather than undercuts 445, 450 in the primary bore 420 to communicate with the pressure biasing chamber 600, the counterbore 425 extends inwardly to form a gap between the pressure biasing surface 440 and the end of the inlet conduit portion 210. This gap communicates the forward and reverse supply ports 240, 245 with the pressure biasing chamber 600.

Thus, the invention provides, among other things, a motor arrangement for a pneumatic tool. Various features and advantages of the invention are set forth in the following claims.

What is claimed is:
1. A valve arrangement comprising:
an inlet conduit defining an inlet passage adapted for communication with a supply of pressurized motive fluid;
a first planar surface spaced radially from the inlet conduit;
first and second supply passages communicating through the first planar surface;
a rotary valve including a second planar surface abutting against the first planar surface and a valve passage communicating through the second planar surface, the rotary valve being rotatable to place the inlet passage in communication with a selected one of the first and second supply passages through the valve passage, and adapted to conduct the pressurized motive fluid from the inlet passage to the selected one of the first and second supply passages; and
a first power reduction port; wherein the rotary valve is rotatable to a power reduction position in which the first power reduction port at least partially communicates with at least one of the valve passage, first supply passage, and second supply passage to cause a portion of motive fluid to bypass one of the first and second supply passages,
wherein the rotary valve is rotatable into a first power reduction position in which both the first power reduction port and the valve passage communicate with the first supply passage such that a portion of motive fluid flowing into the first supply passage flows out of the first supply passage through the first power reduction port to reduce the flow of motive fluid through the first supply passage.

2. The valve arrangement of claim 1, further comprising a second power reduction port in the rotary valve; wherein the rotary valve is rotatable into a second power reduction position in which both the second power reduction port and the valve passage communicate with the second supply passage such that a portion of the motive fluid flowing into the second supply passage flows out of the second supply passage through the second power reduction port to reduce the flow of motive fluid through the second supply passage.

3. The valve arrangement of claim 1, wherein the inlet conduit has an exterior surface, wherein the exterior surface and the inlet passage are adapted for communication with the supply of the pressurized motive fluid;

wherein the inlet passage communicates through the exterior surface;

wherein the rotary valve includes opposite first and second ends, a primary bore surrounding the exterior surface of the inlet conduit and extending between the first and second end, a counter bore in the first end, a biasing surface defined between the primary bore and the counter bore in the first end;

wherein the second planar surface is defined in the second end;

wherein the valve passage communicates between the primary bore and the second planar surface;

a seal between the exterior surface of inlet conduit and the counter bore;

a biasing chamber defined between the seal and the biasing surface; and at least one biasing passage communicating between the inlet passage and the biasing chamber to expose the biasing surface to pressure from the pressurized motive fluid, the at least one biasing passage being separate from the valve passage;

wherein the rotary valve is rotatable to place the inlet passage in communication with a selected one of the first and second supply passages through the valve passage, and adapted to conduct the pressurized motive fluid from the inlet passage to the selected one of the first and second supply passages; and wherein pressure acting on the biasing surface biases the second planar surface against the first planar surface to resist motive fluid leakage between the first and second planar surfaces.

4. The valve arrangement of claim 3, wherein the at least one biasing passage is radially spaced apart from the valve passage.

5. The valve arrangement of claim 3, wherein the exterior surface of the inlet conduit and the primary bore form a seal between the valve passage and the at least one biasing passage.

6. The valve arrangement of claim 3, wherein the at least one biasing passage is sealed from the selected one of the first and second supply passages in communication with the rotary valve.

7. The valve arrangement of claim 3, wherein the at least one biasing passage is at least partially defined between the primary bore of the rotary valve and the exterior surface of the inlet conduit.

8. The valve arrangement of claim 7, wherein the at least one biasing passage is at least partially defined by an open channel in the primary bore.

9. The valve arrangement of claim 3, wherein the at least one biasing passage includes first and second biasing passages; wherein the rotary valve places the second biasing passage in communication with the biasing chamber when the inlet passage communicates through the valve passage with the first supply passage; and wherein the rotary valve places the first biasing passage in communication with the biasing chamber when the inlet passage communicates through the valve passage with the second supply passage.

10. The valve arrangement of claim 3, further comprising a housing surrounding the inlet conduit and rotary valve; wherein the seal includes a first face that defines a portion of the biasing chamber and a second face that bears against the housing; and wherein the housing is not directly exposed to pressurized motive fluid in the biasing chamber.

11. The valve arrangement of claim 1, further comprising:
a housing surrounding the inlet conduit and rotary valve; and
a valve actuator extending through the housing and movable with respect to the housing to actuate the rotary valve.

12. The valve arrangement of claim 11, wherein the valve actuator is not exposed to pressurized motive fluid.

13. The valve arrangement of claim 11, wherein the rotary valve includes a counter bore, a biasing surface defined between the primary bore and the counter bore, a seal between the inlet conduit and the counter bore, a biasing chamber defined between the seal and the biasing surface and at least one biasing passage communicating between the inlet passage and the biasing chamber to expose the biasing surface to pressure from the pressurized motive fluid.

14. The valve arrangement of claim 13, wherein the housing is not directly exposed to pressurized motive fluid in the biasing chamber.

15. The valve arrangement of claim 13, wherein the seal has first and second faces and the biasing chamber is at least partially defined by the first face of the seal; and wherein the second face of the seal abuts against a portion of the housing.

16. The valve arrangement of claim 11, wherein the rotary valve further includes first and second stabilizing protrusions in abutment with the first planar surface; and wherein the rotary valve abuts the first planar surface only through the second planar surface and the first and second stabilizing protrusions.

17. The valve arrangement of claim 11, wherein the rotary valve includes a valve passage, the valve passage having a first portion and a second portion, the first portion of the valve passage communicating between the inlet passage and the forward supply passage in the forward position and the second portion of the valve passage communicating between the inlet passage and the reverse supply passage in the reverse position.

18. The valve arrangement of claim 11, wherein the inlet passage has a first portion and a second portion, the rotary valve communicating between the first portion of the inlet passage and the forward supply passage in the forward position and communicating between the second portion of the inlet passage and the reverse supply passage in the reverse position.

19. The valve arrangement of claim 11, wherein the rotary valve includes an annular groove, the annular groove communicating between the inlet passage and the forward supply passage in the forward position and between the inlet passage and the reverse supply passage in the reverse position.

* * * * *